June 22, 1971  E. E. SHUTTLE  3,585,699

METHOD OF CONNECTING SUBTERRANEAN PIPE LINES

Filed May 12, 1969

INVENTOR.
EUGENE E. SHUTTLE
BY
ATTORNEY.

United States Patent Office

3,585,699
Patented June 22, 1971

3,585,699
METHOD OF CONNECTING SUBTERRANEAN PIPE LINES
Eugene E. Shuttle, 315 Sylvania Ave., Glenside, Pa. 19038
Filed May 12, 1969, Ser. No. 823,921
Int. Cl. B21d 53/00; B21k 29/00; B23p 15/26
U.S. Cl. 29—157                                                                3 Claims

ABSTRACT OF THE DISCLOSURE

The invention is directed to a novel method for extending an existing pipe line such as an underground sewer or the like by connecting to it a lateral or branch line without interfering with the continuous availability for service of the existing line

BACKGROUND OF THE INVENTION

It has heretofore been the practice, when connection of a lateral or branch line to an existing line of clay, terra-cotta or other non-metallic pipe has been desired, to excavate the soil from entirely around the pipe of the existing line in the vicinity of the connection to be made, and in some instances for considerable distances longitudinally therefrom to permit access to the line for repositioning of several sections of pipe, including replacement of one of them by a section having an integral Y or T branch for connection of the lateral line. As an alternative to this laborious operation there have been proposed various modifications in procedure, some of which have been directed to eliminating the use of specially constructed pipe sections having integral Y or T branches.

FIELD OF THE INVENTION

The present invention is thus concerned with the provision of a method for connecting to an existing line of non-metallic pipe a branch line of similar or compatible pipe without requiring an undue amount of excavation in the vicinity of the existing line and by the use of relatively inexpensive and readily available apparatus useful for other purposes as well.

THE DESCRIPTION OF THE PRIOR ART

The prior art procedure in regard to which the present invention constitutes most directly an improvement comprehends excavating a space entirely about the existing pipe line to permit access to it from all directions circumferentially then attaching to the pipe by chains or the like an elaborate cutting machine including a cutting tool comprising a hollow cylindrical shell having cutting teeth at one end adapted to drill through the pipe to form therein a hole which projected onto a plane parallel to the pipe axis is substantially circular; the edges of this hole are then coated with an appropriate adhesive and a usually metallic "saddle" comprising a spigot portion substantially complementary to said hole, and likewise adhesive coated is inserted in the hole and held in place by any appropriate means until the adhesive has set.

Thereafter the branch or lateral pipe is connected to a bell portion of the "saddle" oppositely from its spigot and the line may then progressively be laid therefrom in the usual way.

SUMMARY OF THE INVENTION

The present invention comprises in essence an improvement in the method of cutting holes in existing non-metallic pipes, usually while in situ in existing subterranean pipe pipe lines, to facilitate connection therewith of saddles adapted for reception of branch lines or laterals and without requiring excessive excavation about the existing lines as for mounting of temporary cutting apparatus thereon.

DESCRIPTION OF PREFERRED EMBODIMENT

Figure 1:
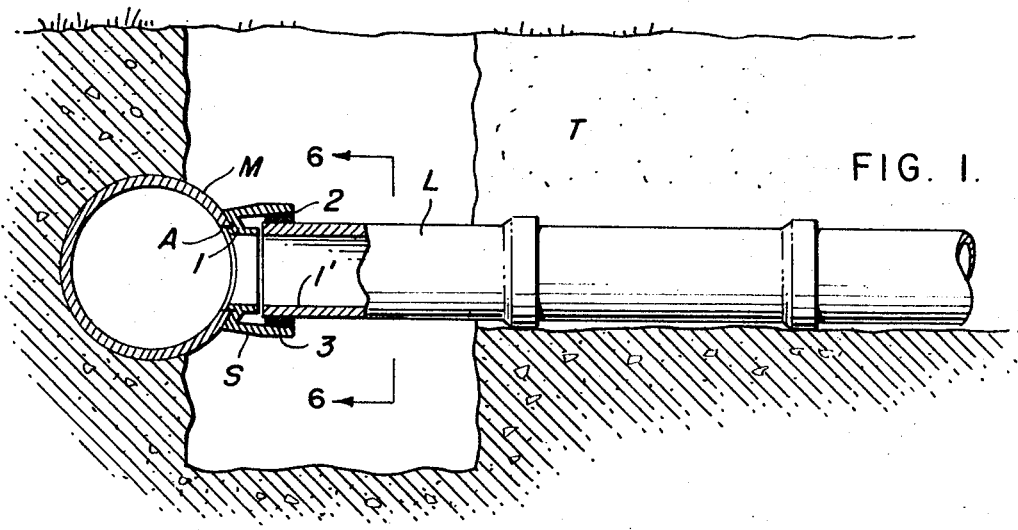
FIG. 1 is a vertical section of subterranean pipe line fragmentarily showing, partly in section, the connection therewith in accordance with the invention of a branch or lateral pipe line such as a drain leading from a home or other building to a main extending in the street overlooked by the building.
Figure 2:
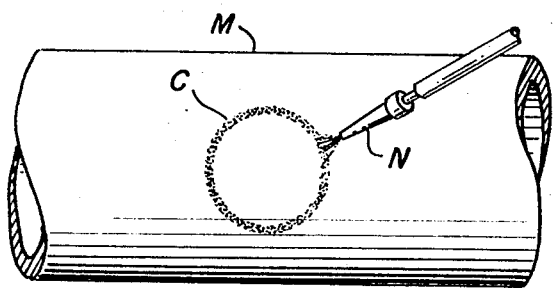
FIG. 2 is a fragmentary diagrammatic representation of one step in the practice of my method in accordance with the preferred procedure.
Figure 3:
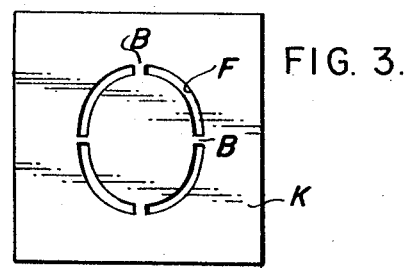
FIG. 3 is a front elevation of a stencil which may be utilized in accordance with a modified procedure.
Figure 4:
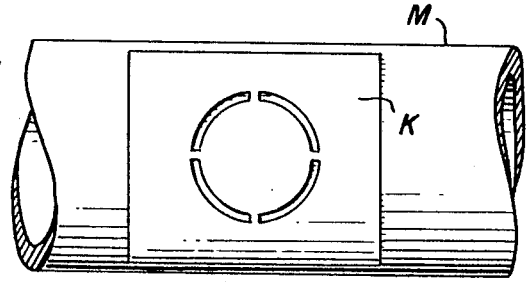
FIG. 4 is a fragmentary front elevation of the main pipe line to which a branch or lateral is to be connected, with the stencil of FIG. 3 applied to it preparatory to cutting into the same.
Figure 5:
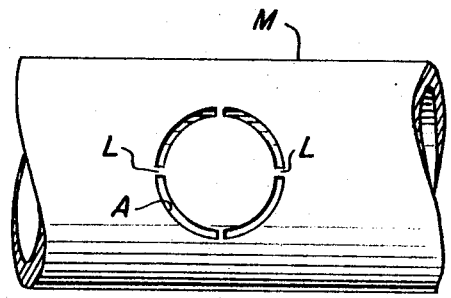
FIG. 5 is a fragmentary elevation of the line showing cuts or kerfs in the pipe wall produced with the assistance of the stencil unit shown in FIGS. 3 and 4 and FIG. 6 is a fragmentary section on line 6—6 in FIG. 1.
Figure 6:
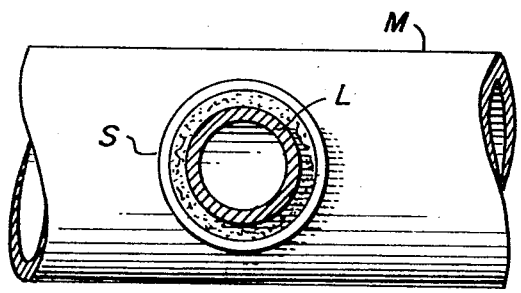

In accordance with the invention when a branch line or lateral L is to be connected with a main, for example for making connection of the sewer pipe of a newly constructed building with an existing sewer main M underlying a public highway, as in the usual practice a trench T is excavated for reception of the pipe sections constituting or to constitute the branch or lateral L disposed to intersect the existing line. When the latter is reached further excavation is discontinued provided the main has been sufficiently exposed to permit the lateral to be connected with it and there is adequate working space in the vicinity. Under prior practices this has required excavating about the entire circumference of the main M where as in accordance with the present invention only one-half or less of the main's circumference facing the lateral to be laid need be exposed, an excavation extending somewhat deeper than the position of the main and lateral being usually provided to permit convenient access.

The point at which the lateral L is to be connected with the main M having been located and usually designated by a mark C on the pipe the invention contemplates bringing into play portable sand blasting equipment of any suitable character, of which numerous examples are well known and need not be specifically illustrated. In the diagrammatic indication of the drawing it comprises a nozzle N through which a jet of fluid usually compressed air carrying abrasive particles at high velocity may be projected. In the hands of a fairly expert operator the nozzle N is then so manipulated as to cause the jet to cut through the pipe wall of the main M to form an aperture therein an axial projection of which in a plane normal to the axis of lateral L is a circle corresponding to and closely complementing a fitting or saddle S to which the lateral is to be connected and now to be more fully described.

The saddle S, of a type readily available in the market place, may be made of aluminum, cast iron or other suitable material and comprises a spigot end 1 and a bell end 2 integral therewith, the spigot end 1 substantially duplicating in shape and size the spigot end 1' of a typical section of the pipe used in construction of the lateral L, while the bell end 2 is so formed as to readily receive a spigot end 1' of such a pipe section, as well as packing material 3, or other sealing means of suitable or preferred character.

This procedure requires the sand blasting nozzle be manipulated by a fairly skilled operative so the aperture A cut in the main fairly closely complements the spigot end 1 of saddle S. The edges of the aperture are then coated with a suitable adhesive, preferably an epoxy resin blended in the field with an appropriate hardener in accordance with usual practices; spigot 1 is similarly coated with the adhesive following which the spigot is inserted in the aperture A and the saddle is held in place by any suitable means (not shown) until the adhesive has set sufficiently to hold the parts together without further assistance. Thereafter the spigot end 1' of the nearest pipe section of lateral L is assembled with the bell end 2 of saddle S, provided with packing 3 or equivalent and construction of the remainder of the lateral may then proceed in accordance with usual practices.

When, as is often the case, an operative sufficiently skilled to form aperture A by free hand manipulation of nozzle N is not available I prefer to provide a mask or shield K comprising a sheet of elastomeric or resilient material relatively impervious to sand blasting, in which an interrupted elliptical figure F is formed defining development in a plane paralleling the axis of main M of the aperture A cut or to be cut in the side of the main. This figure thus corresponds to development of the intersection of a cylinder with the wall of a second cylinder of like or different diameters but with axes normal to each other and hence is substantially elliptical as developed in a plane. To retain the inner core of the figure integral with the remainder of the shield bridges B may be left uncut when the figure F is cut in the shield.

In the employment of this shield for making a lateral connection to a main, after the latter has been exposed the shield is laid over it and held in place by any suitable means (not shown) permitting access through the interstices of figure F of a sandblast jet to the outline of the kerfs to be produced in main M for forming aperture A therein. Appropriate equipment is then brought into play to produce the sandblast jet which thus cuts into the main through said interstices and accurately forms the major portion of aperture A even when the nozzle of the equipment is being manipulated by relatively unskilled hands. After the several kerfs have been incised in the pipe and the shield K removed the small links L corresponding to bridges B may readily be severed leaving the main pipe ready as before to receive the adhesive and the saddle S as above described.

Having thus described my invention I claim and desire to protect by Letters Patent of the United States:

1. The method of securing a lateral branch to a subterranean non-metallic pipe line and the like which comprises excavating in the vicinity of the subterranean pipe to afford access thereto throughout not exceeding about one-half its circumference, in the excavation thus formed introducing means for projecting a high velocity stream of fluid carrying abrasive particles against the surface of the pipe and passing said means relatively to said pipe in a path defining the projection onto the pipe surface of a circle lying in a substantially vertical plane paralleling the pipe axis to thereby separate from the pipe a substantially elliptical portion of the pipe wall and expose an aperture therein, applying an adhesive to the edge of said aperture and then introducing thereinto a complementary spigot portion of a saddle having a portion adapted to conform to the outer wall of the pipe when said spigot portion is entered in said aperture, and finally securing the lateral branch to said saddle.

2. The method defined in claim 1 in which flexible resilient sheet material having interstices substantially corresponding to the aperture to be formed is applied to the pipe surface and removably held in contact therewith during projection of sand particles carrying stream against the pipe through said interstices.

3. The method defined in claim 2 in which said interstices substantially define an elliptical figure having spaced relatively small interruptions shielding corresponding portions of the pipe from access by said stream whereby said stream incises in said pipe through said interstices a plurality of kerfs separated from each other by links which are severed after the kerfs have been incised to provide an aperture for reception of said saddle.

References Cited

UNITED STATES PATENTS

| | | | |
|---|---|---|---|
| 1,210,692 | 1/1917 | Possons | 29—157 |
| 1,882,526 | 10/1932 | Smith | 51—310X |
| 1,966,403 | 7/1934 | Durham | 285—156X |
| 2,268,343 | 12/1941 | Phillips | 29—157 |
| 3,460,553 | 8/1969 | Leopold et al. | 137—15 |
| 3,516,426 | 6/1970 | Toll | 137—15 |

CHARLIE T. MOON, Primary Examiner

U.S. Cl. X.R.

29—407, 414; 51—310; 61—72.4; 137—15; 285—156